(12) United States Patent
Maskatia et al.

(10) Patent No.: US 7,019,964 B1
(45) Date of Patent: Mar. 28, 2006

(54) PORTABLE ELECTRONIC DEVICE

(75) Inventors: Arif Maskatia, San Jose, CA (US);
Stephen Cheung, San Jose, CA (US);
Kelly Kodama, San Jose, CA (US)

(73) Assignee: Acer Inc., (TW)

( * ) Notice: Subject to any disclaimer, the term of this patent is extended or adjusted under 35 U.S.C. 154(b) by 0 days.

(21) Appl. No.: 11/044,672

(22) Filed: Jan. 27, 2005

(51) Int. Cl.
*G06F 1/16* (2006.01)

(52) U.S. Cl. .................... 361/683; 312/223.1; 345/905

(58) Field of Classification Search ........ 248/917–923; 312/223.1–223.2; 345/156, 169, 905
See application file for complete search history.

(56) References Cited

U.S. PATENT DOCUMENTS

| 6,665,173 | B1 * | 12/2003 | Brandenberg et al. | ...... 361/680 |
| 2005/0041381 | A1 * | 2/2005 | Maskatia et al. | ........... 361/683 |

* cited by examiner

*Primary Examiner*—Hung Van Duong
(74) *Attorney, Agent, or Firm*—Ostrolenk, Faber, Gerb & Soffen, LLP

(57) ABSTRACT

A portable electronic device includes a base module and an LCD module. The base module includes a housing that has front and rear end portions and opposite first and second sides that extend between the front and rear end portions, and a pair of pivots mounted on the rear end portion of the housing and disposed adjacent to the first and second sides of the housing, respectively. Each of the pivots is rotatable relative to the housing. The LCD module has opposite first and second sides, each of which is formed with an elongated guiding groove that receives and that engages slidably a respective one of the pivots therein.

7 Claims, 6 Drawing Sheets

PORTABLE ELECTRONIC DEVICE

BACKGROUND OF THE INVENTION

1. Field of the Invention

This invention relates to a portable electronic device, more particularly to a portable electronic device with a pair of cables and a pair of pivots that connect an LCD module to a base module of the electronic device.

2. Description of the Related Art

FIGS. 1 and 2 illustrate a conventional portable computer that includes a base module 11 formed with a pair of opposite rail grooves, and a display panel 12 having a connecting end which is mounted pivotally and slidably on the base module 11 through a pair of pivot pins that respectively extend into the rail grooves. The display panel 12 is pivotable relative to the base module 11 so as to lie on top of the base module 11 as illustrated in FIG. 2 when the connecting end of the display panel 12 is slid to a front end of the base module 11. As such, the portable computer can serve as a tablet computer. The pivot pins are fixed to the connecting end of the display panel 12 so as to be movable together with the display panel 12 along the rail grooves and so as to permit rotation of the display panel 12 relative to the base module 11 when the connecting end of the display panel 12 is disposed at any position between front and rear ends of the base module 11.

The conventional portable computer is disadvantageous in that the display panel 12 tends to be tilted or unbalanced with respect to the base module 11, and undesired rotation of the display panel 12 relative to the base module 11 tends to occur during sliding of the display panel 12 on the base module 11. As a consequence, sliding movement of the display panel 12 is not smooth.

SUMMARY OF THE INVENTION

Therefore, the object of the present invention is to provide a portable electronic device that is capable of overcoming at least one of the aforesaid drawbacks of the prior art.

According to the present invention, there is provided a portable electronic device that comprises: a base module including a housing that has front and rear end portions and opposite first and second sides that extend between the front and rear end portions in a longitudinal direction, the base module further including a pair of pivots mounted on the rear end portion of the housing and disposed adjacent to the first and second sides of the housing, respectively, each of the pivots being rotatable relative to the housing; and an LCD module having opposite first and second sides, each of which is formed with an elongated guiding groove that has an end portion and that receives and that engages slidably a respective one of the pivots therein so as to permit co-rotation of the LCD module and the pivots relative to the base module when the end portions of the guiding grooves in the first and second sides of the LCD module engage respectively and slidably the pivots, and so as to permit sliding movement of the LCD module on the pivots in the longitudinal direction when the LCD module is disposed at a parallel position relative to the base module.

BRIEF DESCRIPTION OF THE DRAWINGS

In drawings which illustrate an embodiment of the invention.

DETAILED DESCRIPTION OF THE PREFERRED EMBODIMENT

Figure 1:
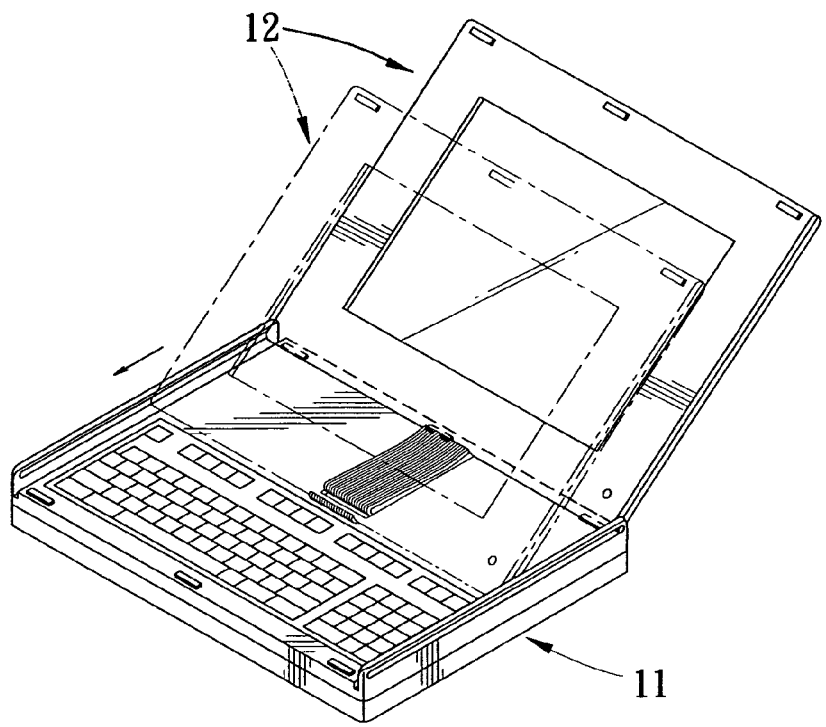
FIG. 1 is a perspective view of a conventional portable computer with a display panel disposed in an upwardly inclined state relative to a base module.
Figure 2:
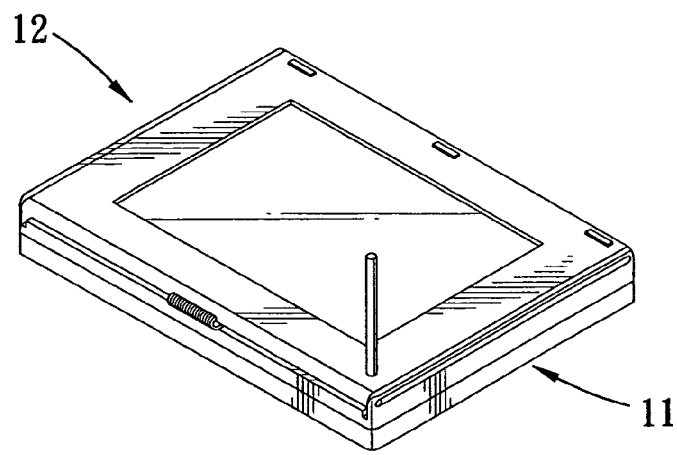
FIG. 2 is a perspective view of the portable computer of FIG. 1 with the display panel disposed in a horizontal state relative to the base module.
Figure 3:
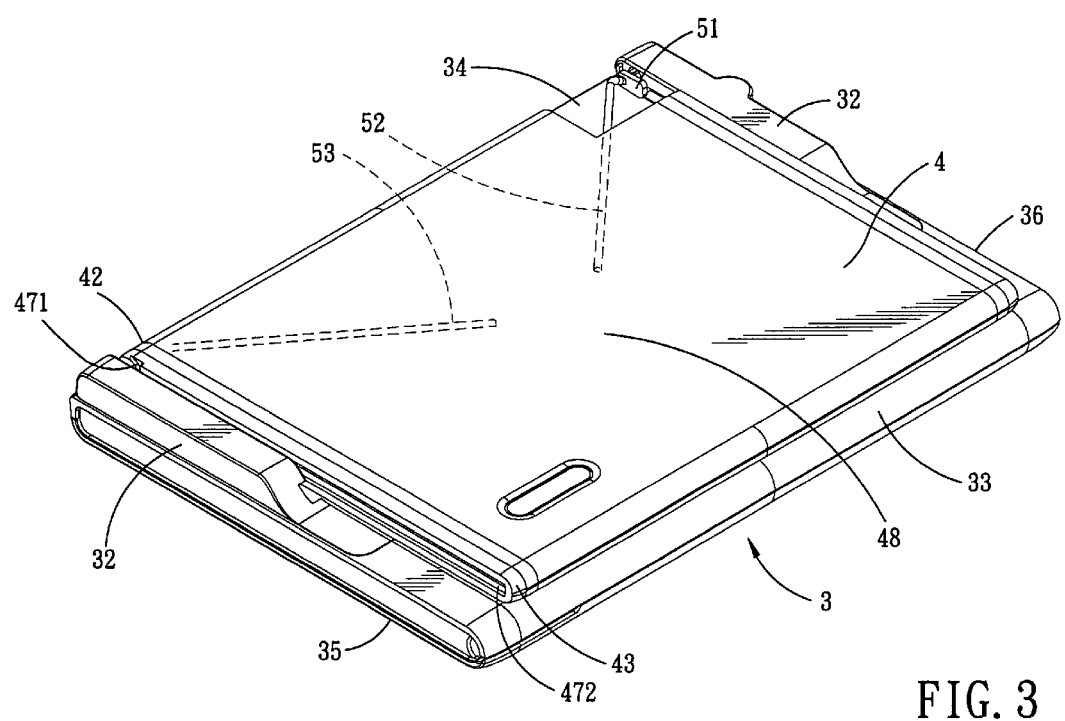
FIG. 3 is a perspective view of the preferred embodiment of a portable computer according to this invention, with a LCD module disposed in a closed state relative to a base module.
Figure 4:
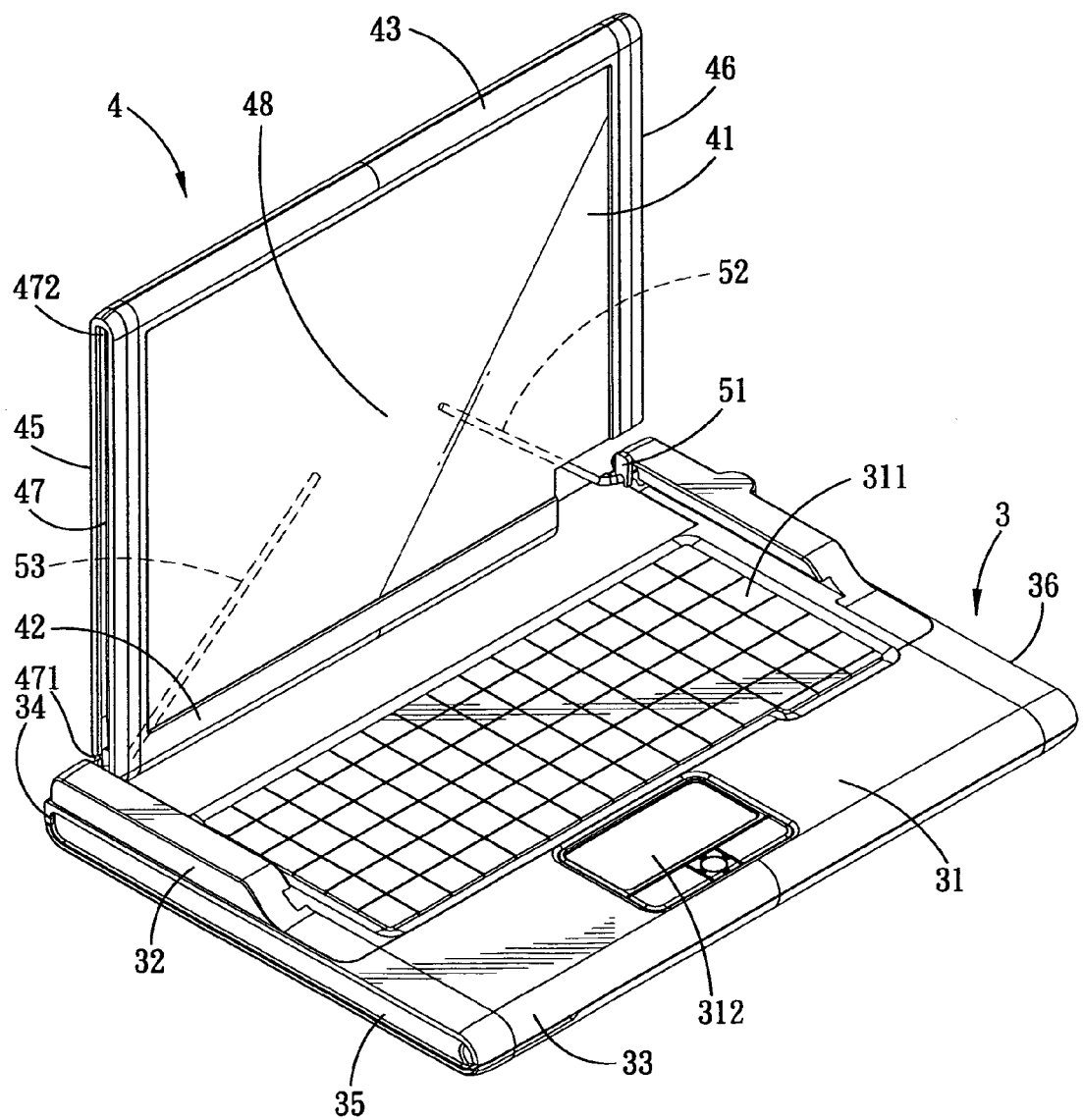
FIG. 4 is another perspective view of the preferred embodiment, with the LCD module disposed in an upwardly inclined state relative to the base module.
Figure 5:
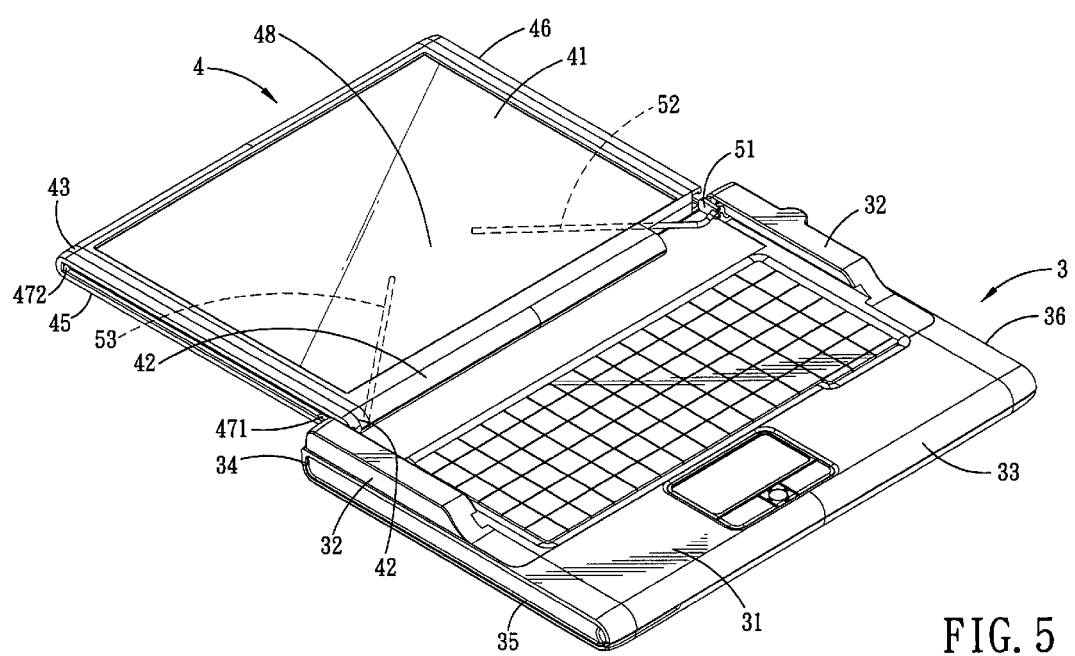
FIG. 5 is yet another perspective view of the preferred embodiment, with the LCD module disposed in a horizontal and extended state relative to the base module.

This invention relates to a portable electronic device, such as a portable computer, a palm PC, a pocket PC, or a cellular phone.

FIGS. 3 to 7 illustrate the preferred embodiment of a portable computer according to the present invention. The portable computer combines an expansion base module 3, which includes a CPU and a hard disc (not shown), and an LCD module 4, such as a liquid crystal display (LCD) panel, a touch input panel, or a slate computer (which normally includes a mother board, a display panel, a battery unit, and electronic components which allow the slate computer to function as a portable computer).

The base module 3 includes a housing 31 that has front and rear end portions 33, 34 and opposite first and second sides 35, 36 that extend between the front and rear end portions 33, 34 in a longitudinal direction. The base module 3 further includes a pair of pivots 51 mounted on the rear end portion 34 of the housing 31 and disposed adjacent to the first and second sides 35, 36 of the housing 31, respectively. Each of the pivots 51 is rotatable relative to the housing 31.

The LCD module 4 has opposite first and second sides 45, 46, each of which is formed with an elongated guiding groove 47 that has an end portion 471 and that receives and that engages slidably a respective one of the pivots 51 therein so as to permit co-rotation of the LCD module 4 and the pivots 51 relative to the base module 3 when the end portions 471 of the guiding grooves 47 in the first and second sides 45, 46 of the LCD module 4 engage respectively and slidably the pivots 51, and so as to permit sliding movement of the LCD module 4 on the pivots 51 in the longitudinal direction when the LCD module 4 is disposed at a parallel position relative to the base module 3.

In this embodiment, each of the guiding grooves 47 has another end portion 472 opposite to the end portion 471. The LCD module 4 has a first end portion 42 that confines the end portions 471 of the guiding grooves 47, and a second end portion 43 that confines the end portions 472 of the guiding grooves 47. The LCD module 4 is slidable relative to the base module 3 between a first position (see FIG. 5), in which the end portions 471 of the guiding grooves 47 engage respectively and slidably the pivots 51, and a second position (see FIG. 7), in which the end portions 472 of the guiding grooves 47 engage respectively and slidably the pivots 51. The pivots 51 abut against the first end portion 42 of the LCD module 4 when the LCD module 4 is slid rearwardly to the first position, thereby limiting further rearward movement of the LCD module 4. The pivots 51 abut against the second end portion 43 of the LCD module 4 when the LCD module 4 is slid frontwardly to the second position, thereby limiting further frontward movement of the LCD module 4.

The portable electronic device further includes tautened first and second cables 52, 53 spaced apart from each other and connected to the LCD module 4 and the base module 3 so as to enhance smoothness in sliding movement of the LCD module 4 on the pivots 51.

The LCD module 4 has a central portion 48 between the first and second sides 45, 46 of the LCD module 4. Each of the first and second cables 52, 53 extends into the LCD module 4, and is fixed to a respective one of the pivots 51 and the central portion 48 of the LCD module 4. The first and second cables 52, 53 diverge away from each other when the LCD module 4 is disposed at the first and second positions, and are electrically coupled to the base module 3 and the LCD module 4.

The base module 3 is formed with first and second confining members 32 that are formed on the housing 31, that are respectively disposed adjacent to the first and second sides 35, 36 of the housing 31, and that extend in the longitudinal direction. The LCD module 4 is disposed between and is limited sidewisely by the confining members 32 during sliding movement from the first position to the second position.

FIGS. 3 to 7 illustrate the progressing states of the LCD module 4 relative to the base module 3 showing how the LCD module 4 is reversed. The LCD module 4 has a screen side 41 that faces downwardly toward the base module 3, is rotated to an upwardly standing position (see FIG. 4), and is further rotated to the first position (see FIG. 5), where the screen side 41 faces upwardly, so as to permit sliding movement of the LCD module 4 to the second position (see FIG. 7), where the portable computer can function as a tablet computer.

Figure 6:
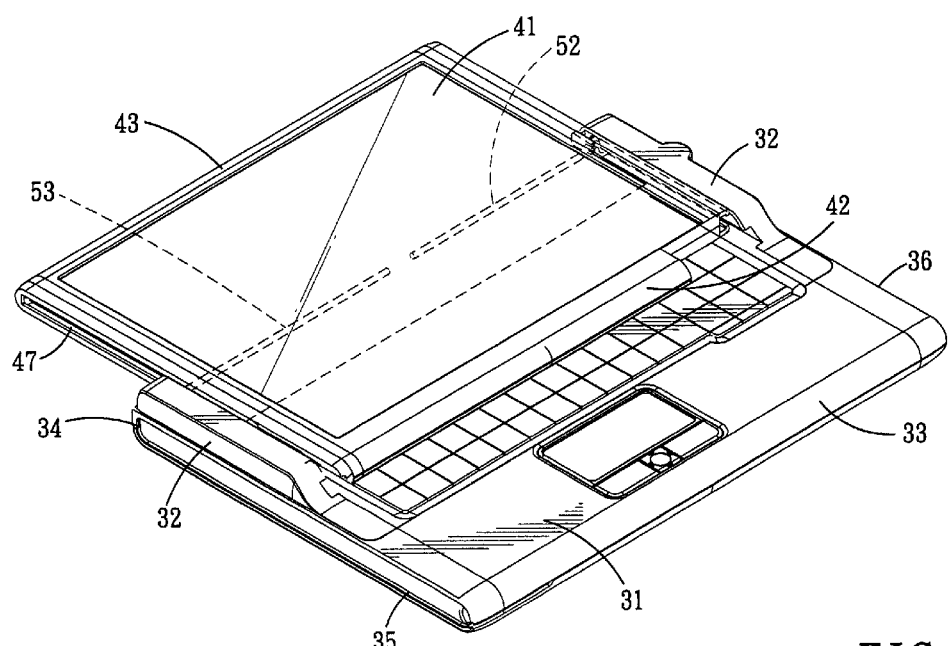
FIG. 6 is still another perspective view of the preferred embodiment, with the LCD module disposed in a half-closed state relative to the base module.
Figure 7:
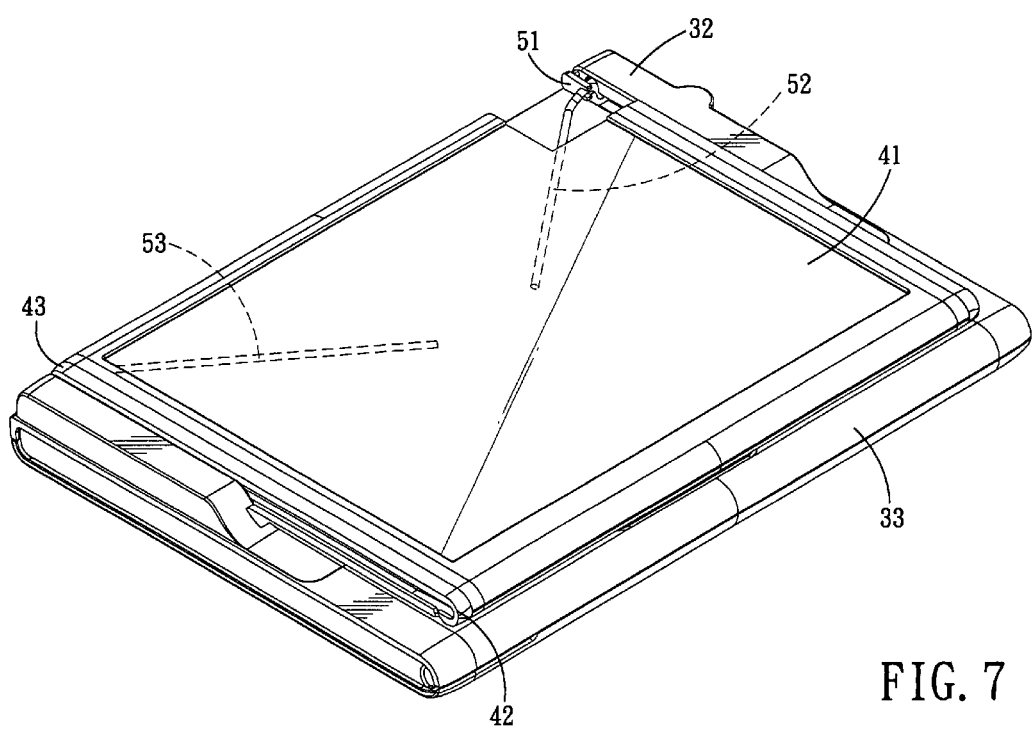
FIG. 7 is a further perspective view of the preferred embodiment with the LCD module disposed in a reversed state as compared to FIG. 3.

As illustrated in FIG. 6, when the LCD module 4 is disposed at a middle position between the first and second positions, the first and second cables 52, 53 are aligned along a straight line. Note that since the pivots 51 are mounted on the base module 3 and cannot move together with the LCD module 4 in the longitudinal direction, therefore, at any position between the first and second positions, the LCD module 4 is prevented from rotation relative to the base module 3 due to interference between the first end portion 42 of the LCD module 4 and the base module 3.

With the inclusion of the guiding grooves 47 and the pivots 51 in the portable computer of this invention, the aforesaid drawbacks associated with the prior art can be eliminated.

With the invention thus explained, it is apparent that various modifications and variations can be made without departing from the spirit of the present invention.

We claim:

1. A portable electronic device comprising:
a base module including a housing that has front and rear end portions and opposite first and second sides that extend between said front and rear end portions in a longitudinal direction, said base module further including a pair of pivots mounted on said rear end portion of said housing and disposed adjacent to said first and second sides of said housing, respectively, each of said pivots being rotatable relative to said housing; and
an LCD module having opposite first and second sides, each of which is formed with an elongated guiding groove that has an end portion and that receives and that engages slidably a respective one of said pivots therein so as to permit co-rotation of said LCD module and said pivots relative to said base module when said end portions of said guiding grooves in said first and second sides of said LCD module engage respectively and slidably said pivots, and so as to permit sliding movement of said LCD module on said pivots in said longitudinal direction when said LCD module is disposed at a parallel position relative to said base module.

2. The portable electronic device of claim 1, wherein each of said guiding grooves has another end portion opposite to said end portion, said LCD module having a first end portion that confines said end portions of said guiding grooves, and a second end portion that confines said another end portions of said guiding grooves, said LCD module being slidable relative to said base module between a first position, in which said end portions of said guiding grooves engage respectively and slidably said pivots, and a second position, in which said another end portions of said guiding grooves engage respectively and slidably said pivots, said pivots abutting against said first end portion of said LCD module when said LCD module is slid rearwardly to said first position, thereby limiting further rearward movement of said LCD module, said pivots abutting against said second end portion of said LCD module when said LCD module is slid frontwardly to said second position, thereby limiting further frontward movement of said LCD module.

3. The portable electronic device of claim 1, further comprising tautened first and second cables spaced apart from each other and connected to said LCD module and said base module so as to enhance smoothness in sliding movement of said LCD module on said pivots.

4. The portable electronic device of claim 3, wherein said LCD module has a central portion between said first and second sides of said LCD module, each of said first and second cables extending into said LCD module and being fixed to a respective one of said pivots and said central portion of said LCD module.

5. The portable electronic device of claim 4, wherein said first and second cables diverge away from each other when said LCD module is disposed at said first and second positions.

6. The portable electronic device of claim 5, wherein said first and second cables are electrically coupled to said base module and said LCD module.

7. The portable electronic device of claim 6, wherein said base module is formed with first and second confining members that are formed on said housing, that are respectively disposed adjacent to said first and second sides of said housing, and that extend in said longitudinal direction, said LCD module being disposed between and being limited sidewisely by said confining members during sliding movement from said first position to said second position.

* * * * *